(12) United States Patent
Hagelin et al.

(10) Patent No.: US 6,735,004 B1
(45) Date of Patent: May 11, 2004

(54) ROTATABLE COUNTERBALANCED ACTUATOR

(75) Inventors: Paul M. Hagelin, Saratoga, CA (US); David R. Pedersen, Sunnyvale, CA (US)

(73) Assignee: Nanogear, Inc., Santa Clara, CA (US)

( * ) Notice: Subject to any disclaimer, the term of this patent is extended or adjusted under 35 U.S.C. 154(b) by 53 days.

(21) Appl. No.: 10/099,246

(22) Filed: Mar. 15, 2002

Related U.S. Application Data

(60) Provisional application No. 60/276,744, filed on Mar. 15, 2001.

(51) Int. Cl.[7] .............................................. G02B 26/08
(52) U.S. Cl. ....................... 359/198; 359/199; 359/212; 359/223; 359/224; 310/306; 310/309; 310/311
(58) Field of Search .................. 359/196–226, 359/871–872; 385/18; 310/90.5, 306, 307, 309, 311, 313 B, 36, 40 R, 46, 66

(56) References Cited

U.S. PATENT DOCUMENTS

| | | | | |
|---|---|---|---|---|
| 5,280,377 A | * | 1/1994 | Chandler et al. | ............ 359/196 |
| 5,867,297 A | * | 2/1999 | Kiang et al. | ................. 359/198 |

* cited by examiner

*Primary Examiner*—James Phan
(74) *Attorney, Agent, or Firm*—Christie, Parker & Hale, LLP

(57) ABSTRACT

A counterbalanced actuator for steering a beam of light is disclosed. The actuator includes a rotatable actuator member coupled to a substrate, a movable portion of an actuator drive mechanism coupled to the rotatable actuator member, a balancing spring coupled between the substrate and the movable portion of the actuator drive mechanism, and an actuator arm operably coupled to the movable portion of the actuator drive mechanism. The balancing spring maintains the movable portion of the actuator drive mechanism nominally, parallel to the substrate when the actuator arm is rotated. An optical mirror element is coupled to the actuator arm. The actuator also includes apparatus for applying a first drive voltage to the movable portion of the actuator drive mechanism and a second drive voltage to a fixed portion of the actuator drive mechanism to position the mirror. Also disclosed is an optical subassembly for directing at least one beam of light including a plurality of micromirror assemblies on a substrate, where each micromirror assembly includes an optical mirror coupled to a plurality of counterbalanced actuators attached to the substrate. A method of actuating a micromirror assembly and a system for actuation the micromirror assembly is also disclosed.

15 Claims, 7 Drawing Sheets

ROTATABLE COUNTERBALANCED ACTUATOR

CROSS-REFERENCE TO RELATED APPLICATION

This application claims the benefit of U.S. provisional patent application Ser. No. 60/276,744, filed Mar. 15, 2001, the contents of which are hereby incorporated by reference.

FIELD OF THE INVENTION

The invention relates generally to the field of optical telecommunications, and more specifically to MEMS actuators for positioning optical mirror elements.

BACKGROUND OF THE INVENTION

The emergence of high-speed optical data communication networks with their associated routing and reconfiguration requirements has created a need for high-speed, high-bandwidth fiber-to-fiber switching systems. Switching of data from one fiber to another typically utilizes an optical-to-electrical input stage, an electronic switching matrix, and an electrical-to-optical output stage, referred to as optical-electrical-optical (OEO) conversion. With the advent of dense wavelength division multiplexing (DWDM), a single optical fiber may contain data streams on one to 160 or more different channels operating at predefined optical wavelengths. Switching this large number of channels with increasingly higher data rates places large demands on OEO switch configurations, requiring many components, higher power consumption, and large cabinetry to house the equipment. Furthermore, with an increasing number of input fibers and output fibers in such systems, compact, accurate, and rapidly reconfigurable alternatives are needed to meet the demand for compact, high-performance fiber optic switches in single-mode and multimode optical networks.

Opto-mechanical switches may meet these demands by using optical mirror elements that are actively positioned to guide one or more beams of light from each input fiber to one of potentially thousands of output fibers in long-haul and metropolitan telecommunication networks. Use of mirrors eliminates the need for OEO conversions in many cases, because an accurately positioned mirror may readily redirect light from a selected input fiber to a selected output fiber. An optomechanical cross-connect system, however, may require a large number of mirrors and associated actuators for positioning the mirrors. The mirrors and actuators need to be accurately and tightly configured to accommodate large port-count switches in a compact environment.

One solution to small and large port-count switches utilizes microelectromechanical systems (MEMS) devices, fabricated using high precision and highly replicable processes similar to those used in semiconductor manufacturing. Aspects of these systems are described, for example, in "Optical Mirror System with Multi-Axis Rotational Control," U.S. Pat. No. 6,283,601 by P. M. Hagelin, et al., issued Sep. 4, 2001.

Mirror elements used in optical switching systems may be a scanning type, which is able to tilt an optical mirror about one or two axes to redirect a beam of light. Other approaches include a pop-up or switching mirror that interrupts and re-directs a beam of light into a specific output port, requiring at least one mirror for each output fiber, replicated for each input port.

Scanner-based mirror systems capable of redirecting light from one input port to one of many output ports may use only a single or perhaps two scanning mirrors per port. To accommodate large port counts, the scanning mirrors may require large tilt angles exceeding ten degrees about one or two degrees of freedom.

Positioning or tilting the mirrors requires accurate, compact microactuators that are fast, reliable and use low power, while providing large tilt angles with multiple-axis rotational control. The actuator and mirror assemblies should be constructed with high precision while avoiding the need for post-assembly. The actuators should provide large deflections to position the mirror, generate large forces and operate with low voltages and low power. The actuators should be strong, lightweight, compact, and readily scalable. The actuators and mirror assemblies would preferably be built using a process that provides high repeatability, affordability and scalability.

It is an object of the present invention to provide an actuator for micropositioning applications such as steering a beam of light, by overcoming the barriers and obstacles described above.

SUMMARY OF THE INVENTION

An actuator for steering a beam of light in accordance with the present invention is disclosed. The actuator may include a rotatable actuator member coupled to a substrate, a movable portion of an actuator drive mechanism coupled to the rotatable actuator member, a balancing spring coupled between the substrate and the movable portion of the actuator drive mechanism, and an actuator arm coupled to the movable portion of the actuator drive mechanism. During actuation, the actuator arm may be rotated while the balancing spring maintains the movable portion of the actuator drive mechanism essentially parallel to the substrate. Among the types of drive mechanisms that may be used with the actuator are a thermal drive mechanism, a piezoelectric drive mechanism, a magnetic drive mechanism, and various electrostatic drive mechanisms including a parallel-plate electrostatic drive mechanism and an interdigitated electrostatic drive mechanism.

The actuator of the present invention may be part of an optical subassembly that may direct or steer at least one beam of light using an optical mirror element. The optical mirror may be coupled to at least one counterbalanced actuator. The mirror may be positioned at a desired height and tilt angle using the counterbalanced actuators.

A method of actuating a micromirror assembly including at least one counterbalanced actuator and a mirror element may include the steps of applying a first control voltage to a movable portion of a counterbalanced actuator; applying a second control voltage to a fixed portion of the counterbalanced actuator; positioning a micromirror coupled to the counterbalanced actuators; and directing a beam of light with the micromirror.

DETAILED DESCRIPTION OF THE INVENTION

Aspects of the present invention include mechanisms and methods for raising three-dimensional structures from an essentially two-dimensional substrate, and for providing the capability to lift, rotate or position an element attached to one or more actuators formed from a micromachining process. For the specific application of an optical switch or scanner, as well as any application requiring micropositioning, a rotor may be used with an actuator mechanism that mechanically amplifies the rotor motion. The rotor or movable portion of the actuator drive mechanism may be coupled to an actuator arm that tilts or rotates with one end of the arm lifting well above the substrate. The displacements attainable may greatly exceed the thickness of any structural or sacrificial layers used in the micromachining process. Other aspects include faster actuation speed, low applied voltage requirements, and a rotatable actuator and drive mechanism that may use either surface or bulk micromachining processes.

Figure 1:
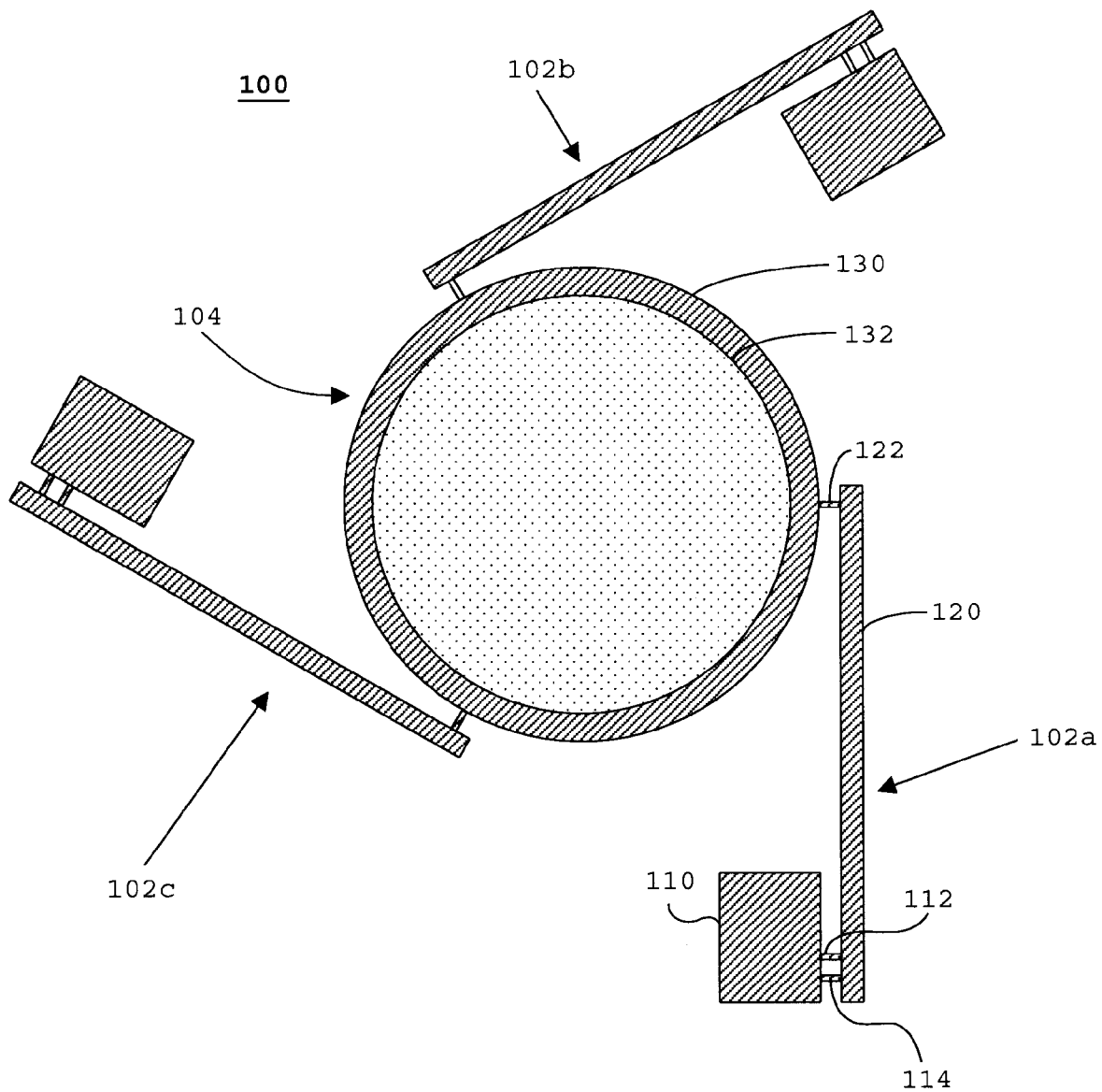
FIG. 1 illustrates a top view of one embodiment of an optical micromirror assembly, in accordance with the current invention.

FIG. 1 shows a top view of one embodiment of a micromirror assembly, in accordance with the present invention at 100. An optical micromirror assembly 100 may include a plurality of counterbalanced actuators 102a, 102b, and 102c, and an optical mirror or micromirror element 104 coupled to the counterbalanced actuators. Counterbalanced actuators 102a, 102b, and 102c may be attached to a substrate. The counterbalanced actuators may be used to position micromirror element 104 in a suitable manner for redirecting an incident beam of light off of the micromirror. Micromirror element 104 may be lifted by each of the counterbalanced actuators, and effectively rotated about one or two axes by varying the height of each micromirror attachment point. Although three counterbalanced actuators are shown coupled to each micromirror, two or more counterbalanced actuators may be used to lift, rotate or position the micromirror. The micromirror assembly may be replicated on the substrate in a linear or rectangular fashion to form a micromirror assembly array or optical subassembly.

Counterbalanced actuator 102a may be comprised of an actuator drive mechanism 110 and an actuator arm 120. Actuator arm 120 may be coupled to the actuator drive mechanism and to the substrate with one or more hinges 112, 114. Actuator arm 120 may mechanically amplify motions of actuator drive mechanism 110 to position or tilt micromirror element 104. A small motion of a movable portion of the actuator drive mechanism may result in a much larger motion at the end of actuator arm 120. The ratio of a displacement of an end of actuator arm 120 to the displacement of the movable portion of actuator drive mechanism 110 may be greater than two, and may exceed 40. In one currently preferred embodiment, a triad of counterbalanced actuators 102a, 102b, and 102c may be used to position and tilt micromirror element 104 three-dimensionally.

Actuator arm 120 may be coupled to micromirror element 104 with a micromirror hinge 122. The micromirror hinge may be a relatively short, straight torsional hinge. Alternatively, the micromirror hinge may be comprised of a series of straight, torsional and/or flexural segments that allow rotation and bending of the hinge. Micromirror hinge 122 may allow positioning of micromirror element 104 by elevation changes at an end of actuator arm 120.

Micromirror element 104 may be comprised of a micromirror support 130 and an optical reflector 132. Optical reflector 132 may be comprised of gold, aluminum, platinum, or any suitable metal or dielectric stack for reflecting and redirecting a beam of light. Optical reflector 132 may be formed on micromirror support 130. Micromirror support 130 may be formed from a layer of polycrystalline silicon, single crystal silicon, or any suitable micromirror support material.

Actuator arm 120 may be formed from a layer of polycrystalline silicon, single crystal silicon, or any suitable actuator arm material. The actuator arm and the micromirror support layer may be formed from a single layer of polycrystalline silicon, single crystalline silicon or other suitable structural layer or composite layers thereof. Similarly, the micromirror hinges and actuator hinges may be formed from the same layer. A portion of the actuator drive mechanism may also be made from the same layer. Although it may be desirable to form various portions of the actuator mechanism from the same layer of material to benefit from uniform thickness and locally uniform sidewall profiles, additional layers and materials may be used in lieu of or to augment the structural layer.

Portions or all of the counterbalanced actuators and micromirrors may be fabricated using a micromachining process with one or more free-standing structural layers, such as a multi-user MEMS process that allows one or many devices to be fabricated simultaneously on a single wafer. Portions or all of the counterbalanced actuators and micromirrors may be fabricated using a micromachining process utilizing silicon-on-insulator (SOI) substrates with one or more sacrificial and structural layers. A surface micromachining process, a bulk micromachining process or some combination of the two may be used to fabricate the counterbalanced actuators and micromirrors. Each torsional spring, actuator arm or a mirror support may be fabricated, for example, using a deposited polysilicon thin film, an active silicon layer or device layer of an SOI wafer, or a single crystal silicon substrate.

Micromirror element 104 exemplifies one application of the present invention where a beam of light may be scanned or switched with the micromirrors. Other elements may be substituted for the optical reflector, such as a microlens, a grating, or any other optical element. The microactuators may be used to position other non-optical elements.

Figure 2:
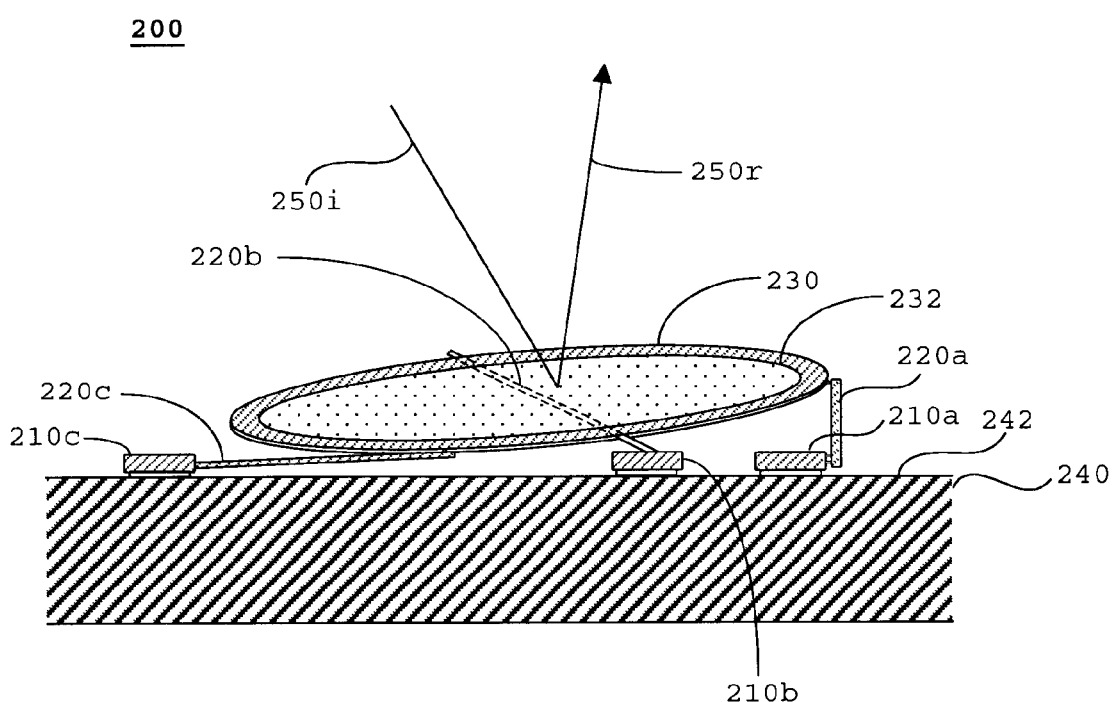
FIG. 2 illustrates a side view of one embodiment of an optical micromirror assembly, in accordance with the current invention.

FIG. 2 shows a side view of one embodiment of an optical micromirror assembly, in accordance with the present invention at 200. Micromirror assembly 200 may be one of a plurality of micromirror assemblies on a substrate, which may be part of a larger optical subassembly for steering at least one beam of light. Each micromirror assembly may comprise an optical mirror operably coupled to a plurality of counterbalanced actuators attached to the substrate.

In one currently preferred embodiment, micromirror assembly 200 may comprise a triad of counterbalanced actuators 210a, 210b, 210c, a micromirror support 230, an optical reflector 232, and a substrate 240. Substrate 240 may comprise a portion of a silicon wafer, a typical semiconductor material used in the manufacture of integrated circuits. The silicon wafer may be sawed or diced to provide optical subassemblies with one or more micromirrors and their corresponding actuators on a die or strip.

Each counterbalanced actuator 210a, 210b, and 210c may be attached to a substrate surface 242. Counterbalanced actuators 210a, 210b and 210c may be coupled to actuator arms 220a, 220b and 220c, respectively. Actuator arms 220a, 220b and 220c may be coupled to micromirror support 230 on which optical reflector 232 may be formed. Counterbalanced actuators 210a, 210b and 210c may be utilized to rotate and lift the ends of actuator arms 220a, 220b and 220c, respectively. Actuator arms 220a, 220b and 220c may be used to position the micromirror and control the angles of mirror tilt about two orthogonal axes. For each actuator arm 220a, 220b and 220c, a ratio of a displacement of at least a portion of actuator arms 220a, 220b and 220c to a displacement of a movable portion of an actuator drive mechanism corresponding to counterbalanced actuators 210a, 210b and 210c may be greater than two.

An incident light beam 250i directed onto optical reflector 232 may be redirected as a reflected light beam 250r according to the tilt of the micromirror, as positioned by the counterbalanced actuators.

Figure 3:
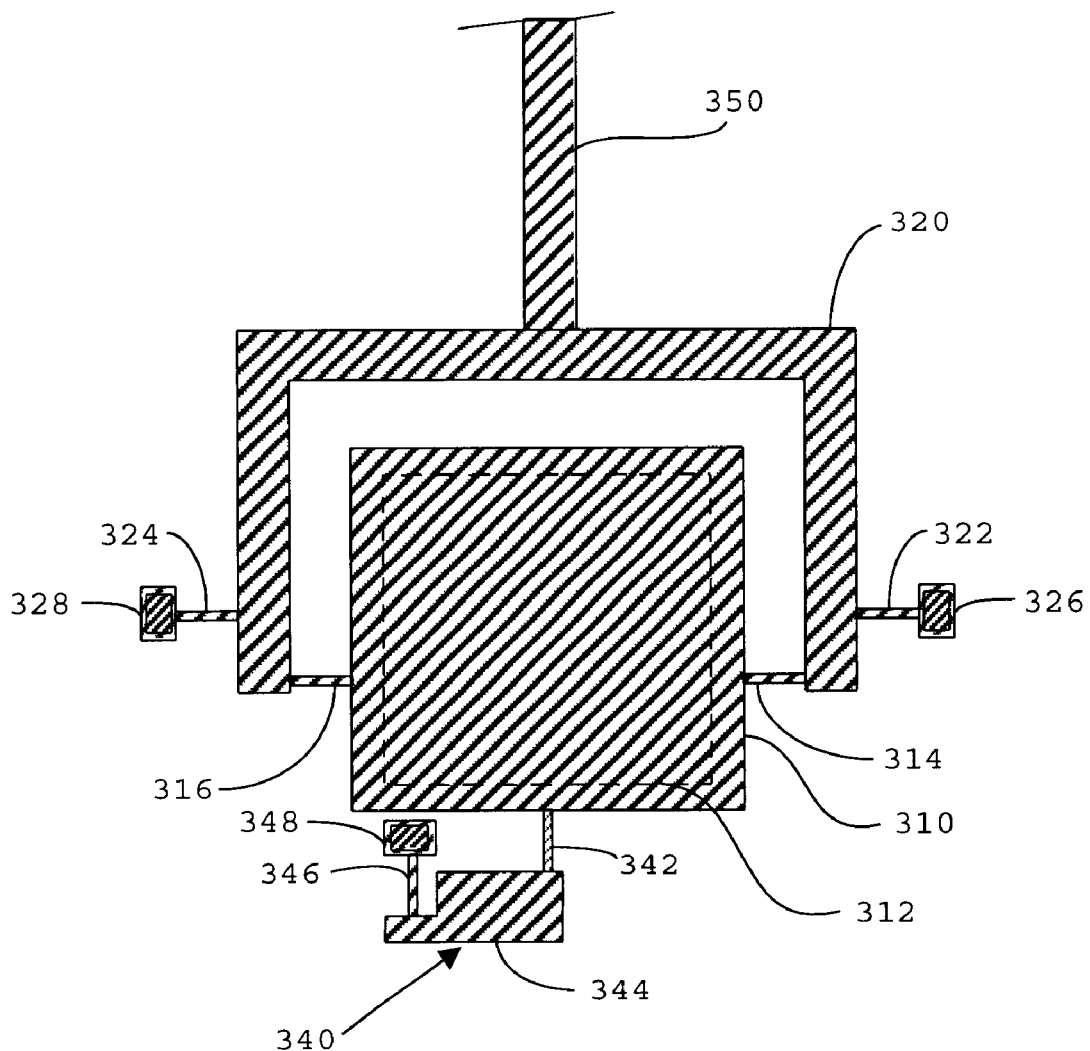
FIG. 3 illustrates a top view of one embodiment of a counterbalanced actuator with a parallel-plate electrostatic drive mechanism, in accordance with the current invention.

FIG. 3 shows a top view of one embodiment of a counterbalanced actuator with a parallel-plate electrostatic drive mechanism, in accordance with the present invention at 300. Counterbalanced actuator 300 may be configured to lift and position a micromirror element as part of a micromirror assembly.

Counterbalanced actuator 300 may comprise an actuator drive mechanism, an actuator frame or rotatable actuator member 320, and a balancing spring 340. An actuator arm 350 may be connected to rotatable actuator member 320. An optical mirror element may be coupled to one end of actuator arm 350. An optical mirror element or other element may be connected to one end of actuator arm 350, and may be lifted, rotated or positioned by one or more counterbalanced actuators.

The parallel-plate electrostatic drive mechanism may include a rotor or movable portion 310 of the actuator drive mechanism and a stator or fixed portion 312 of the actuator drive mechanism. In the case of the parallel-plate electrostatic drive mechanism, an upper electrode or movable portion 310 of the actuator drive mechanism may comprise a plate positioned above a lower electrode or fixed portion 312 of the actuator drive mechanism. The movable portion 310 and the fixed portion 312 may form two electrodes of a parallel-plate capacitor. When voltages are applied to the movable portion and the fixed portion, the movable portion may be electrostatically attracted to the fixed portion in response to the voltage difference between the two electrodes. The force generated may depend on the gap between the electrodes. The movement of the upper electrode may depend on the generated force and the mechanical support mechanism for the movable portion. The lower electrode or fixed portion 312 of the parallel-plate electrostatic drive mechanism may correspond to a doped region in the underlying substrate. The lower electrode or fixed portion 312 of the parallel-plate electrostatic drive mechanism may be formed from a metal layer or a semiconductor layer such as polycrystalline silicon, deposited on an electrically insulative layer such as silicon nitride or silicon dioxide deposited on the substrate. Movable portion 310 of the parallel-plate electrostatic drive mechanism may be coupled to rotatable actuator member 320 with one or more actuator hinges.

Actuator hinges 314, 316 may be used to couple rotatable actuator member 320 to movable portion 310 of the parallel-plate electrostatic drive. Actuator hinges 314, 316 may include torsional hinges with a single segment or a series of segments that connect rotatable actuator 320 with movable portion 310 in a compliant manner. Actuator hinges 314, 316 may be a relatively short, straight torsional hinge. Alternatively, the actuator hinges may be comprised of a series of straight, torsional and/or flexural segments that allow rotation and bending of the hinge. Rotatable actuator member 320 may be coupled to the substrate.

Rotatable actuator member 320 may be coupled to the substrate with one or more substrate hinges 322, 324. Substrate hinges may comprise a relatively short, straight torsional hinge. Alternatively, substrate hinges may comprise a series of straight, torsional and/or flexural segments that allow rotation and bending of the hinge. Substrate hinges 322, 324 may be connected to the substrate with substrate anchors 326, 328. Substrate anchors 326, 328 may be attached to the surface of the substrate. An actuator arm 350 may be connected to rotatable actuator member 320.

Actuator arm 350 may lift when rotatable actuator member 320 is rotated. Rotatable actuator member 320 may be rotated about substrate hinges 322, 324 when movable portion 310 of the actuator drive mechanism is deflected towards the substrate, due to forces transferred to the rotatable actuator member by actuator hinges 314, 316.

When the movable portion 310 of the actuator drive mechanism is displaced causing a rotation of rotatable actuator member 320, the movable portion itself may rotate unduly. Undue rotations of the movable portion may cause the electrode to prematurely snap towards the substrate due to an electrostatic pull-in effect, leading to lack of control of actuator motion and potentially to sticking of movable portion 310 to the substrate. A method of providing a suitable countertorque to mitigate rotation of movable portion 310 is to provide a balancing spring 340. Balancing spring 340 provides a countertorque to movable portion 310 to counterbalance movable portion 310 and to maintain it nominally parallel to the substrate when actuated. Balancing spring 340 may be used to ensure that movable portion 310 of the actuator drive mechanism is maintained essentially normal to the substrate when operated. Movable portion 310 may be guided such that the lower surface of the electrode remains essentially parallel to the top surface of the underlying substrate. Because of balancing spring 340, the entire movable portion 310 may be displaced normal to the substrate, maximizing the available capacitance change before pull-in is reached, and thus maximizing the output force. A restoring force transferred by the actuator hinges and balancing spring may counter the actuation force.

Balancing spring 340 may be coupled between movable portion 310 of the actuator drive mechanism and the substrate. Balancing spring 340 may consist of two torsional hinges 342, 346 and a nominally rigid connecting member 344. The torsional hinges may comprise a relatively short, straight torsional hinge. Alternatively, the torsional hinges may comprise a series of straight, torsional and/or flexural segments that allow rotation and bending of the hinge. Torsional hinge 342 may be connected between movable portion 310 and nominally rigid connecting member 344. Torsional hinge 346 may be connected between nominally rigid connecting member 344 and the substrate with substrate anchor 348. The length of torsional hinges 342, 346 and nominally rigid connecting member 344 of balancing spring 340 may be a function of the torsional spring constants of actuator hinges 314, 316 and substrate hinges 322, 324, the geometry of the electrostatic drive mechanism, and the distances between the hinges.

An actuator hinge, substrate hinge, micromirror hinge or torsional hinge may consist of a single, straight element with an essentially rectangular cross-section. Each hinge element may be attached at either end to a nominally rigid structure. Rotations of the structure at either end may result in a twisting action of the torsional hinge. A mechanical moment generated at one end of the torsional hinge may be transferred to the other end. Angular displacements at the far end of the spring with respect to the near end may depend on the length, width and thickness of the hinge and other structural elements in the mechanism. The torsional hinges may consist of a single segment or a series of segments in various configurations, such as a serpentine configuration, to provide flexural or bending properties in addition to torsional spring properties.

As the movable portion 310 of the actuator drive mechanism moves toward the fixed portion 312 of the actuator drive mechanism, a force may be transferred to actuator hinges 314, 316, causing rotatable actuator member 320 along with actuator arm 350 to rotate through an angle. When the actuator arm is rotated, balancing spring 340 may maintain movable portion 310 of the actuator drive mechanism nominally parallel to the substrate. The displacement of one end of actuator arm 350 may be at least twice that of a displacement of movable portion 310 of the parallel-plate electrostatic actuator, and may be larger by a factor of forty or more. The maximum displacement of movable portion 310 may be limited to a portion of the interelectrode gap.

The sacrificial layer thickness of the microfabrication process may determine the interelectrode gap between the fixed and movable electrodes. The gap between the two electrodes with no applied voltage may be essentially equal to that of the sacrificial layer thickness.

Another advantage of the spring configuration of the present invention is that movable portion 310 of the actuator drive mechanism may be suspended parallel to the substrate and furthermore, may be configured to be independent of loading on actuator hinges 314, 316. Dimensions and placement of the torsional hinges, balancing spring, rotor, actuator, and actuator hinges may be selected such that counterbalancing capability is maintained even with variations in the loading at the end of an actuator arm.

Other benefits of the current invention may include higher force generation per unit area of the actuator and lower applied voltage requirements. Higher force and lower actuation voltage may be obtained, for example, by decreasing the interelectrode gap, or by increasing the area of the parallel-plate electrodes.

Another feature of counterbalanced actuator 300 is that rotatable actuator member 320, movable portion 310 of the actuator drive mechanism, and balancing spring 340 may be formed from one layer of single crystal silicon or deposited polycrystalline silicon. By extension, actuator arm 350 may be formed from the same layer. Additional elements of various hinges 314, 316, 322, 324, as well as substrate anchors 326, 328, and 348 also may be formed from the same layer, although are not limited to the one layer.

In some embodiments of the present invention, the torsional hinges may be dimensioned with essentially identical lengths and widths to provide some immunity to sidewall etch profile variations and etch undercutting from the micromachining process, such that the counterbalancing capability of the balancing spring is largely insensitive to etch variations of the microfabrication process. Flexural members and other portions of the actuator may benefit from similar dimensioning considerations.

Figure 4:
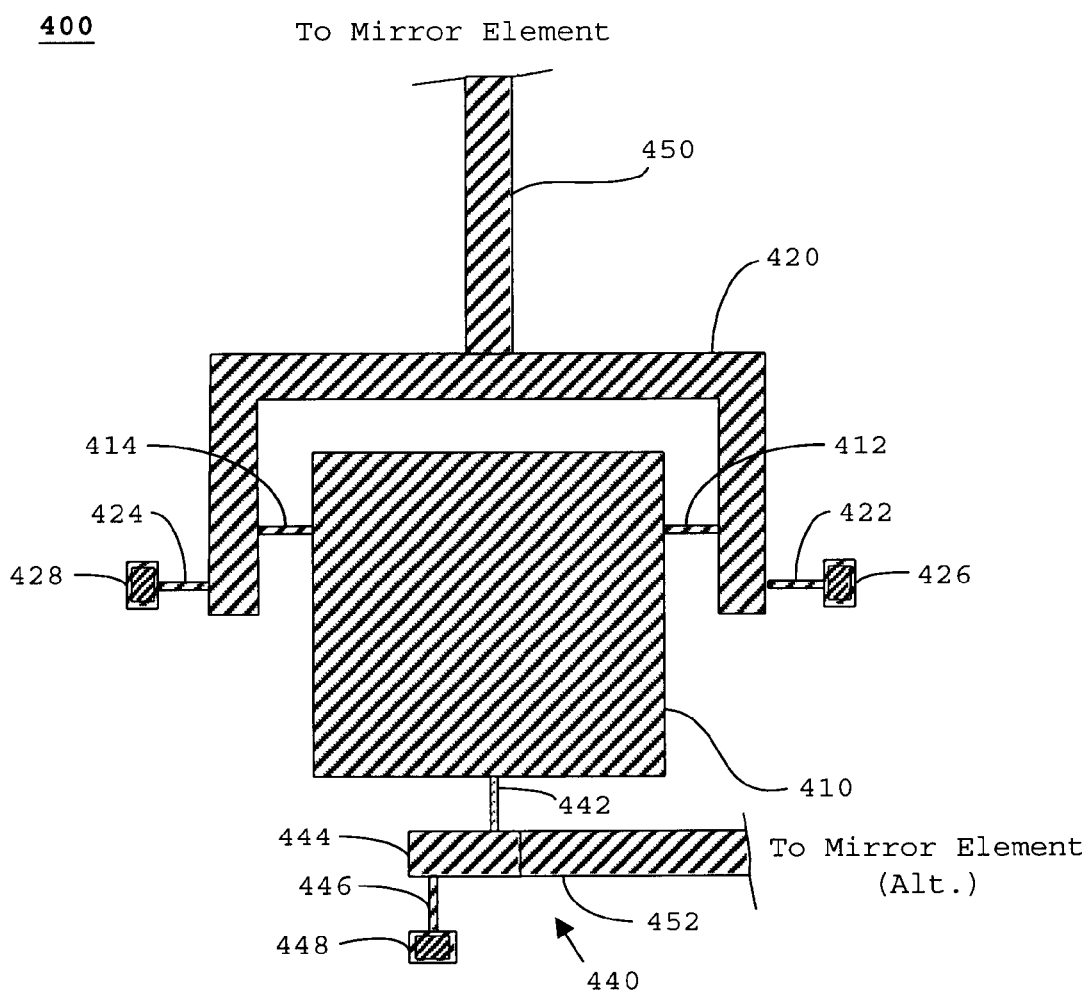
FIG. 4 illustrates a top view of one embodiment of a counterbalanced actuator with an electrostatic drive mechanism, in accordance with the current invention.

FIG. 4 shows a top view of another embodiment of a counterbalanced actuator, in accordance with the present invention at 400. In this embodiment, the movable portion of the electrostatic drive mechanism may deflect in the opposite direction as the one illustrated in FIG. 3.

Counterbalanced actuator 400 may include a movable portion 410 of an electrostatic drive mechanism; at least two actuator hinges 412, 414; an actuator frame or rotatable actuator member 420, at least two substrate hinges 422, 424; at least two substrates anchors 426, 428; a balancing spring 440 with a nominally rigid connecting member 444 between two torsional hinges 442, 446; and an actuator arm 450 that may be coupled to rotatable actuator member 420.

When electrostatic force is generated by movable portion 410 of the electrostatic drive mechanism, actuator hinges 412, 414 may couple the force into rotatable actuator member 420. Rotatable actuator member may be coupled to the substrate with substrate hinges 422, 424. Substrate hinges 422, 424 may be connected to the substrate with substrate anchors 426, 428. Balancing spring 440 may be used to ensure that moveable portion 410 of the actuator drive mechanism remains parallel to the surface of the substrate during actuation. Torsional hinge 442 may be coupled to the movable portion 410 of the electrostatic drive and to nominally rigid connecting member 444. Nominally rigid connecting member 444 may be attached to torsional hinge 446, which may be coupled to the substrate by use of substrate anchor 448.

The actuator drive mechanism may rotate rotatable actuator member 420. Rotation of rotatable actuator member 420 may be used to rotate actuator arm 450, causing a micromirror element attached to actuator arm 450 to be positioned.

In an alternative configuration, actuator arm 452 may be connected to nominally rigid connecting member 444 of balancing spring 440. When movable portion 410 of the actuator drive mechanism is actuated, it may cause lifting of torsional hinge 442, which in turn may lift and rotate nominally rigid connecting member 444 of balancing spring 440 and rotate attached actuator arm 452. The result may be a deflection of a micromirror element at an attachment point near the end of actuator arm 452. In either actuator arm configuration, the mirror attachment point may be deflected bidirectionally when the movable portion 410 of the plate drive is driven bidirectionally.

Figure 5:
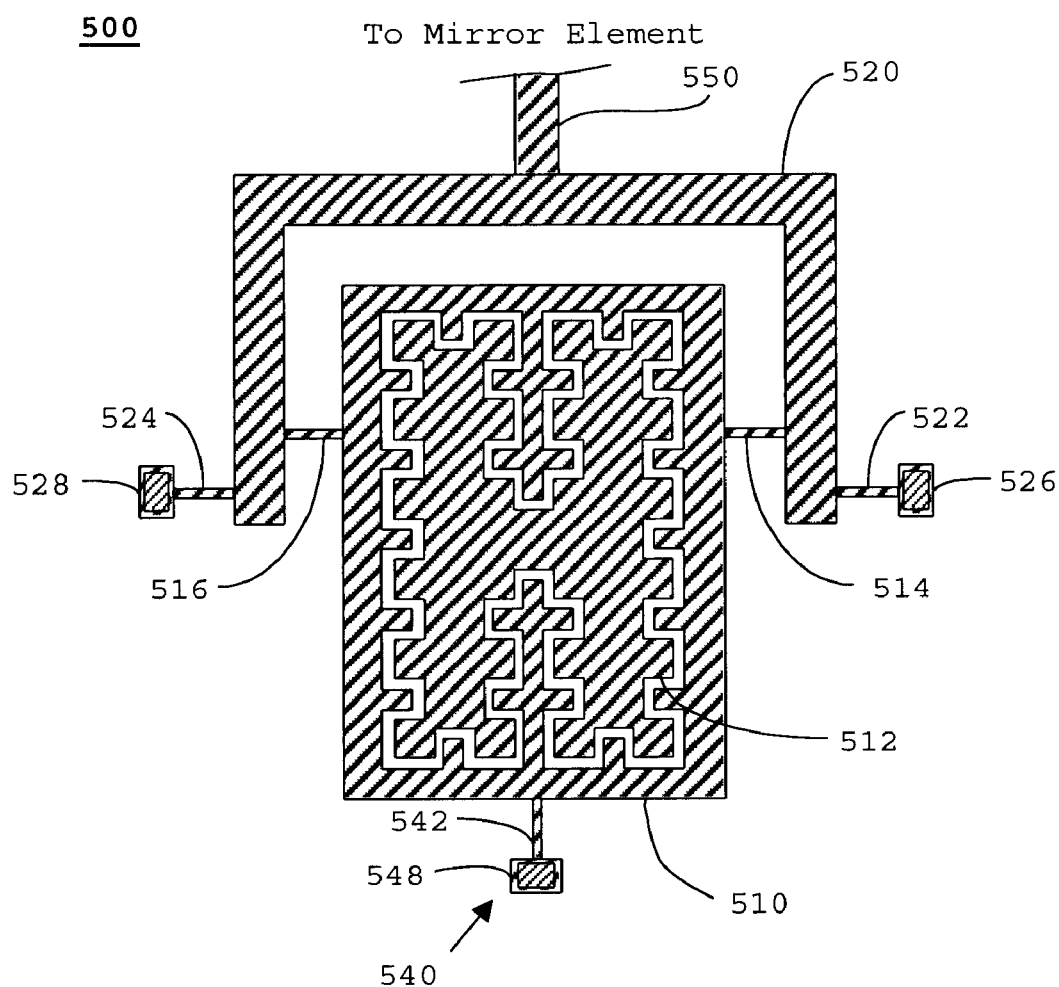
FIG. 5 illustrates a top view of one embodiment of a counterbalanced actuator with an interdigitated electrostatic drive mechanism, in accordance with the current invention.

FIG. 5 shows a top view of one embodiment of a counterbalanced actuator with an interdigitated electrostatic drive mechanism, in accordance with the present invention at 500. The interdigitated electrostatic drive mechanism may also be referred to as a comb drive mechanism or a vertical comb drive. In one preferred embodiment, the interdigitated electrostatic drive mechanism may comprise a number of interleaved fingers for deflecting a movable portion of the actuator drive mechanism in an upwards direction away from the substrate, with an applied voltage.

Counterbalanced actuator 500 with an interdigitated electrode actuator mechanism may include a rotor or movable portion 510 of the interdigitated electrostatic drive mechanism, a stator or fixed portion 512 of the interdigitated electrostatic drive mechanism, a rotatable actuator frame or rotatable actuator member 520, and a flexural member or balancing spring 540. An actuator arm 550 may be connected to rotatable actuator member 520. An optical mirror element may be coupled to one end of actuator arm 550.

Counterbalanced actuator 500 with an interdigitated electrode actuator mechanism may comprise one electrode as a movable portion 510 of the interdigitated electrostatic drive mechanism; a second electrode as a fixed portion 512 of the electrostatic drive mechanism; at least two actuator hinges 514, 516; a rotatable actuator member 520 coupled to the substrate with at least two substrate hinges 522, 524 and two substrate anchors 526, 528; a balancing spring 540 comprising a flexural spring 542 coupling the movable portion 510 to the substrate with substrate anchor 548; and an actuator arm 550 that may be connected to rotatable actuator member 520 and a mirror element (not shown).

Actuator hinges 514, 516 may couple the movable portion 510 of the actuator drive mechanism to rotatable actuator member 520. Rotatable actuator member 520 may be coupled to the substrate with substrate hinges 522, 524 by use of substrate anchors 526, 528.

Balancing spring 540, which is coupled to movable portion 510 of the actuator drive mechanism, may be used to ensure that the movable portion of the actuator drive mechanism is maintained nominally parallel to the surface of the substrate during activation. The balancing spring in this embodiment or in any of the disclosed embodiments may comprise a single flexural element as illustrated, or may comprise one or more torsional, flexural and nominally rigid elements, or any combination thereof.

The movable portion of the rotatable actuator mechanism may include an array of fingers extending from at least one side. Interleaved with each set of fingers on the movable portion is an array of fingers on the fixed portion of the actuator mechanism. Application of control voltages to the fixed and movable portions of the interdigitated electrostatic drive mechanism allows movable portion 510 to be directed up, down, or held in place. As movable portion 510 of the interdigitated electrostatic drive mechanism moves with respect to fixed portion 512 of the interdigitated drive, a force may be applied to actuator hinges 514, 516 causing rotatable actuator member 520 along with actuator arm 550 to rotate through an angle and to mechanically amplify the motion of the counterbalanced actuator, and to lift, rotate, or reposition a micromirror attached near the end of actuator arm 550.

An interdigitated electrostatic drive actuator may generate more force by increasing the number of fingers, increasing the length of the fixed and movable fingers, reducing the gap between the fingers, or increasing the drive voltage. Movable portion 510 of the interdigitated electrostatic drive actuator may move up or down essentially normal to the substrate as a modulated voltage is applied to the pairs of fingers. A lower surface of movable portion 510 of the actuator drive mechanism may remain nominally parallel to the substrate during the actuation due to a countertorque generated by balancing spring 540.

While the illustration shows an interdigitated electrostatic drive mechanism with its movable portion 510 on the outer perimeter of the drive, movable portion 510 may be configured as an inner portion of the actuator drive mechanism with the fixed portion of the actuator drive mechanism on the outer perimeter. Multiple interdigitated electrostatic drive mechanisms may be used in parallel to increase the actuation force and lifting capability of the actuator arms. One or more interdigitated electrostatic drive mechanisms, parallel-plate electrostatic drive mechanisms, other suitable drive mechanisms, and combinations thereof, may be used.

Figure 6:
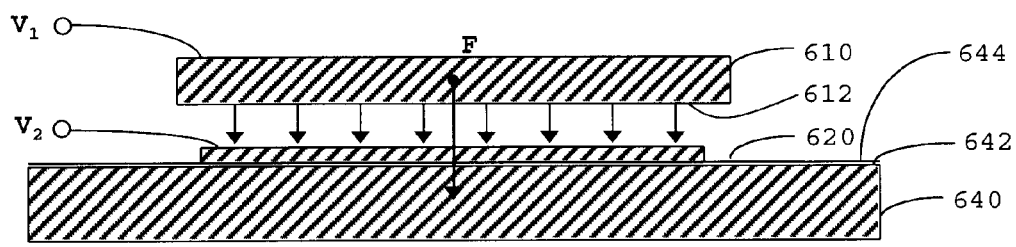
FIG. 6 illustrates a side view of one embodiment of a parallel-plate electrostatic drive mechanism, in accordance with the current invention.

FIG. 6 shows a side view of one embodiment of a parallel-plate electrostatic drive mechanism, in accordance with the present invention at 600. The figure illustrates the generation of downward force with applied voltage, with a first drive voltage V1 applied to the rotor or movable portion of the actuator drive mechanism and a second drive voltage V2 applied to a stator or fixed portion of the actuator drive mechanism.

Parallel-plate electrostatic drive mechanism 600 may include an upper electrode or movable portion 610 of a parallel-plate electrostatic drive mechanism, a lower electrode or fixed portion 620 of the parallel-plate electrostatic drive mechanism, and a substrate 640. The fixed portion 620 of the electrostatic drive mechanism may be electrically isolated from substrate 640 by an insulating layer or dielectric layer 644. Alternatively, the fixed portion 620 of the electrostatic drive mechanism may be formed integrally with the substrate by localized doping of the semiconductor substrate. The lower surface 612 of the movable portion 610 may be essentially parallel to the upper surface 642 of substrate 640. The upper electrode or movable portion 610 may be separated from the lower electrode or fixed portion 620 by an interelectrode gap.

A downward, attractive force F may be generated by coulombic attraction between movable portion 610 and fixed portion 620 of the parallel-plate electrostatic drive mechanism when voltages V1 and V2 are applied across the electrodes. An electric field may be generated between the electrodes, generating a force proportional to the square of the voltage difference and inversely proportional to the interelectrode gap. The force may displace movable portion 610 towards fixed portion 620. Restoring forces are transferred by torsional springs and flexural members attached to movable portion 610 not shown in the illustration. As a capacitive structure, the electrostatic actuator may increase its capacitance when a voltage difference is applied to the electrodes and the gap between the two electrodes is reduced. Referred to as snap-in or pull-in condition, if a sufficiently large voltage is applied across the electrodes, the plates may become mechanically unstable and collapse towards each other, a normally detrimental condition of operation to be avoided. The balancing spring, torsional and flexural members supporting the movable portion may be configured to retain lower surface 612 of movable portion 610 essentially parallel to upper surface 642 of substrate 640 during motion to achieve a large, usable range of motion.

Figure 7:
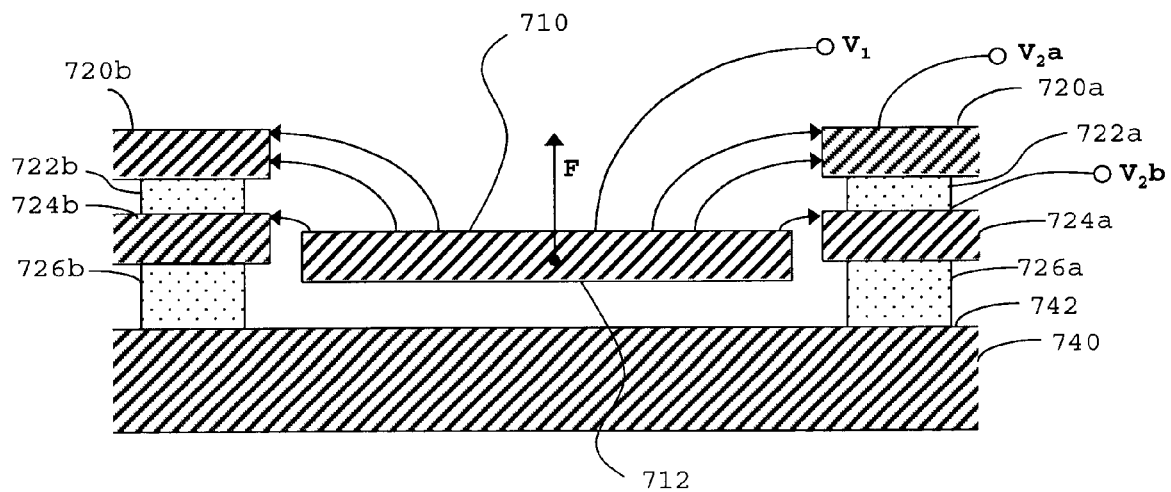
FIG. 7 illustrates a side view of one embodiment of an interdigitated electrostatic drive mechanism, in accordance with the current invention.

FIG. 7 shows a side view of one embodiment of an interdigitated electrostatic drive mechanism, in accordance with the present invention at 700. Interdigitated electrostatic drive mechanism 700 may comprise a rotor or movable portion 710 of the electrostatic drive mechanism, a stator or fixed portion 720a, 720b of the electrostatic drive mechanism, and a substrate 740. Torsional hinges and flexural members not shown in the illustration may support movable portion 710 of the interdigitated electrostatic drive mechanism. Fixed portion 720a, 720b may be electrically isolated from the substrate. Electrical isolation from the substrate may be achieved with dielectric 722a, 722b. Electrical isolation from the substrate may be achieved with dielectric 722a, 722b in combination with dielectric 726a, 726b. Optionally, an additional electrode or fixed portion 724a, 724b of the electrostatic drive mechanism may be placed between dielectrics 722a, 722b and 726a, 726b. The dielectric layers may allow voltage to be placed across the electrodes, and may provide physical space or height elevation between the electrodes and the substrate.

The dielectrics, conductive portions, and gaps may be configured in other arrangements. For example, fixed portions 720a, 720b and 724a, 724b may be electrically and physically connected to each other. Fixed portions 720a, 720b and 724a, 724b may be electrically and physically connected to each other, for example, with gaps between the conductive portions at select locations.

A first voltage V1 may be applied to a first electrode or movable portion 710 of the interdigitated electrostatic drive mechanism, and a second voltage V2 may be applied to a second electrode or fixed portion 720a, 720b of the interdigitated electrostatic drive mechanism. The second voltage V2 may be applied to an additional electrode or fixed portion 724a, 724b. Voltage V2 may be simultaneously applied to fixed portions 720a, 720b and 724a, 724b. Alternatively, a voltage V2a may be applied to fixed portion 720a, 720b, and a voltage V2b may be applied to fixed portion 724a, 724b. A substrate voltage may be applied to substrate 740. The substrate voltage may be set equal to the voltage applied to movable portion 710, or both substrate 740 and movable portion 710 may be set equal to a ground potential. Substrate 740 and movable portion 710 may have different applied voltages.

An upward, attractive force F may be generated by coulombic attraction between movable portion 710 and fixed portion 720 of the interdigitated electrostatic drive mechanism when voltages V1 and V2 are applied to movable portion 710 and fixed portions 720a, 720b and 724a, 724b, respectively. An electric field may be generated between the electrodes, generating a force that is a function of the voltage difference and the effective gap. The force may displace movable portion 710 towards fixed portion 720, though flexural members and torsional hinges supporting movable portion 710 and structural symmetry may constrain the movement of movable portion 710 to a direction essentially perpendicular to substrate 740. Movable portion 710 may lift from substrate 740 with increasing voltage difference applied to the electrodes. Movable portion 710 may lift to a level nearly planar with fixed portion 720a, 720b due to curvature of electric field lines and upward components of force not illustrated in the figure.

Torsional springs and flexural members attached to movable portion 710 may generate restoring forces with displacements of movable portion 710. The balancing spring, torsional and flexural members supporting the movable portion may be configured to retain lower surface 712 of movable portion 710 essentially parallel to upper surface 742 of substrate 740 during motion to achieve a large, usable range of motion.

The interdigitated electrostatic drive actuator may generate more force by utilizing a series of interdigitated fingers and by increasing the amount of interdigitated finger overlap between movable portion 710 and fixed portion 720a, 720b. The generated force may increase as larger drive voltages are applied across the gap between the fingers. Narrowing the interelectrode gap, increasing the peripheral area of the drive electrode, or increasing the number of fingers may increase the ability to generate force. Increasing the drive voltage may also increase the generated force.

Although the illustration shows a tiered structure of multiconductor comb fingers and dielectrics, the interdigitated configuration may have, for example, fixed portion 724a, 724b formed by one layer of fingers and one layer of dielectrics 726a, 726b. A conductive ground plane, not shown in the figure, may be included on the surface of substrate 740 underneath movable portion 710 of the interdigitated electrostatic drive mechanism. The ground plane may be electrically isolated from the substrate by a dielectric layer, also not shown in the figure. The potential of the ground plane may be set the same as the potential of movable portion 710. The ground plane may be separated from substrate 740 by a silicon dioxide or silicon nitride dielectric layer.

An electrostatic drive mechanism combining the attractive features of the parallel-plate electrostatic drive mechanism and lifting features of the interdigitated electrostatic drive mechanism may be configured.

Figure 8:
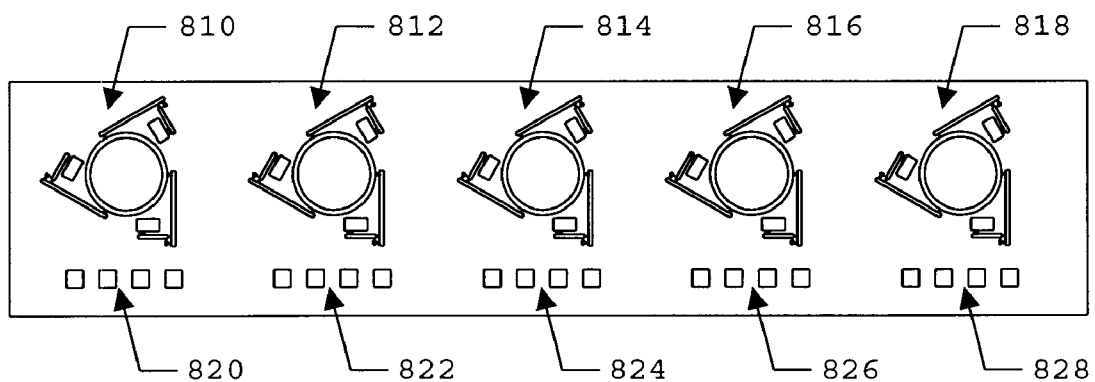
FIG. 8 illustrates a top view of one embodiment of an optical subassembly for directing one or more beams of light, in accordance with the current invention.

FIG. 8 shows a top view of one embodiment of an optical subassembly for directing one or more beams of light, in accordance with the present invention at 800. Optical subassembly 800 may include a plurality of micromirror assemblies 810, 812, 814, 816, 818 on a substrate. Although five micromirror assemblies are shown in the illustration, fewer or more micromirror assemblies may be configured on a strip or die in a linear array, rectangular array or other array style.

Each micromirror assembly may include an optical mirror operably coupled to a plurality of counterbalanced actuators attached to the substrate. Each counterbalanced actuator may include a rotatable actuator member, a movable portion of an actuator drive mechanism, a balancing spring, and an actuator arm. The rotatable actuator member may be coupled to the substrate and the movable portion of the electrostatic drive mechanism. The balancing spring may be coupled between the movable portion of the actuator drive mechanism and the substrate. The actuator arm may be coupled to the rotatable actuator member. The actuator arm may be coupled to the substrate. Each optical mirror or micromirror may be coupled to one or more counterbalanced actuators. Each optical mirror may be coupled to a triad of counterbalanced actuators. The counterbalanced actuators may be used to position the micromirror. The positioned micromirror may direct a beam of light incident on the micromirror towards a desired direction.

Optical subassembly 800 may include bond pads for applying voltages to actuate each counterbalanced actuator. A micromirror coupled to each counterbalanced actuator may be positioned by applying appropriate drive voltages to sets of bonding pads 820, 822, 824, 826, 828 electrically connected to each micromirror assembly 810, 812, 814, 816, 818, respectively. Four pads associated with each counterbalanced actuator are illustrated for applying a first control voltage to a movable portion of the counterbalanced actuator, and a second control voltage to a fixed portion of the counterbalanced actuator. In the triad configuration shown, the substrate or ground plane voltage may be applied in common to each actuator in the triad. Alternatively, the substrate or ground plane voltage may be applied in common to all actuators in the subassembly, further reducing the number of pads and bonding wires attached to the pads.

Although direct application of drive voltages for the counterbalanced actuators using bond pads is illustrated in optical subassembly 800, other approaches may be used to provide the desired voltages. For example, integrated circuitry may be co-fabricated on the semiconductor substrate, using multiplexers, voltage amplifiers, charge amplifiers, digital-to-analog converters, analog-to-digital converters, serial data converters, digital signal processors or any suitable circuit element or combination of circuit elements to actuate the counterbalanced actuators.

Figure 9:
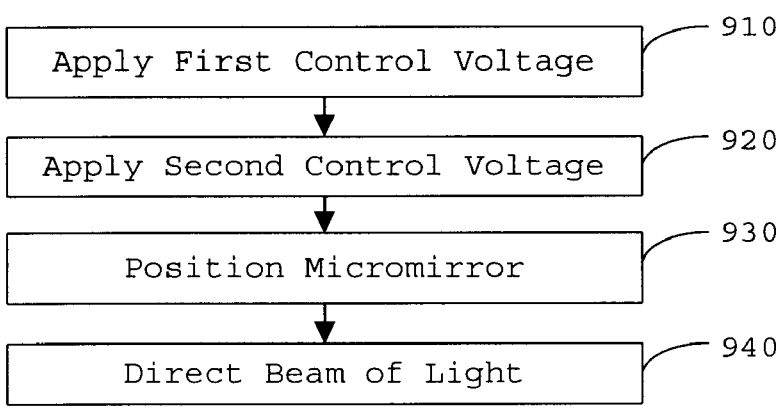
FIG. 9 shows a flow diagram of one embodiment of a method for actuating a micromirror assembly, in accordance with the current invention.

FIG. 9 shows a flow diagram of one embodiment of a method for actuating a micromirror assembly, in accordance with the present invention at 900.

A first control voltage may be applied to the movable portion of the actuator drive mechanism, as seen at block 910. A second control voltage may be applied to the fixed portion of the actuator drive mechanism, as seen at block 920. By use of actuator arms coupled to the counterbalanced actuators, the micromirror may be positioned, as seen at block 930. An incident beam of light may be steered or directed by the positioned mirror towards a desired direction, as seen at block 940.

Even though the presently preferred embodiments illustrate the use of electrostatic drive mechanisms, the implementation of the current invention may include other actuator drive mechanisms such as a thermal drive mechanism, a piezoelectric drive mechanism, and a magnetic drive mechanism. The thermal drive mechanism may convert, for example, an applied voltage or current into heat thereby expanding a portion of the actuator drive mechanism, which may be coupled into rotatable actuator members and associated actuator arms to position a mirror element. A piezoelectric drive mechanism may convert, for example, an applied voltage to expand or bend a portion of the actuator drive mechanism, which may be coupled into rotatable actuator members and associated actuator arms to position the micromirror. A magnetic drive mechanism may convert, for example, an applied voltage or current into a magnetic field for driving a rotatable actuator member and associated actuator arms to position the micromirror.

While the current invention has been presented in the context of optical beam steering, scanning and switch applications, the counterbalanced electrostatic actuators may be used in other fields such as microbiology, microfluidics, and micromechanics, where an actuator may be used to manipulate or position an object or element other than a micromirror or optical element.

Although the present invention has been described in accordance with the embodiments shown, one of ordinary skill in the art may recognize variations to the embodiments, and those variations would be within the spirit and scope of the present invention. For example, the shape, number and composition of the counterbalanced actuators and micromirrors may be altered as desired without departing from the basic function of the elements. Dimensional changes may be made to enhance or optimize other parameters such as force generation, voltage requirements, power consumption, speed of actuation, mirror-tilt angle, actuator angle, or vertical-height capability. Alterations to the process such as film thicknesses, doping levels, dielectric-layer constituency, number and characteristics of conductive and structural layers, substrate type, film-deposition parameters, and etching characteristics may be made without departing from the basic function of the elements. Accordingly, many modifications may be made by one of ordinary skill in the art without departing from the spirit and scope of the appended claims. While certain exemplary embodiments have been described and shown in the accompanying drawings, it is to be understood that such embodiments are merely illustrative of and not restrictive to the broad invention, and that this invention not be limited to the specific constructions and arrangements shown and described, since various other modifications may occur to those ordinarily skilled in the art.

What is claimed is:

1. An actuator for steering a beam of light comprising:
   a rotatable actuator member coupled to a substrate;
   a movable portion of an actuator drive mechanism coupled to the rotatable actuator member;
   a balancing spring coupled between the substrate and the movable portion of the actuator drive mechanism; and
   an actuator arm operably coupled to the movable portion of the actuator drive mechanism, wherein the balancing spring maintains the movable portion of the actuator drive mechanism nominally parallel to the substrate when the actuator arm is rotated.

2. The actuator of claim 1 wherein the substrate comprises at least a portion of a silicon wafer.

3. The actuator of claim 1 wherein the rotatable actuator member is coupled to the substrate with at least one substrate hinge.

4. The actuator of claim 1 wherein the rotatable actuator member is coupled to the movable portion of the actuator drive mechanism with at least one actuator hinge.

5. The actuator of claim 1 wherein the balancing spring comprises two torsional hinges and a nominally rigid connecting member.

6. The actuator of claim 1 wherein the actuator arm is connected to the rotatable actuator member.

7. The actuator of claim 5 wherein the actuator arm is connected to the nominally rigid connecting member of the balancing spring.

8. The actuator of claim 1 wherein the rotatable actuator member, the movable portion of the actuator drive mechanism, and the balancing spring are formed from a layer of single crystal silicon.

9. The actuator of claim 1 wherein the rotatable actuator member, the movable portion of the actuator drive mechanism, and the balancing spring are formed from a layer of polycrystalline silicon.

10. The actuator of claim 1 wherein the actuator drive mechanism comprises a parallel-plate electrostatic drive mechanism.

11. The actuator of claim 1 wherein the actuator drive mechanism comprises an interdigitated electrostatic drive mechanism.

12. The actuator of claim 1 wherein the actuator drive mechanism is selected from the group consisting of an electrostatic drive mechanism, a thermal drive mechanism, a piezoelectric drive mechanism, and a magnetic drive mechanism.

13. The actuator of claim 1 wherein a ratio of a displacement of at least a portion of the actuator arm to a displacement of the movable portion of the actuator drive mechanism is greater than two.

14. The actuator of claim 1 further comprising:
   an optical mirror element coupled to the actuator arm.

15. The actuator of claim 1 further comprising:
   means for applying a first drive voltage to the movable portion of the actuator drive mechanism and a second drive voltage to a fixed portion of the actuator drive mechanism.

* * * * *